— 
United States Patent Office 3,096,249
Patented July 2, 1963

3,096,249
EMULSION COMPOSITION
Samuel J. Prigal, 55 Park Ave., New York 17, N.Y.
No Drawing. Filed May 10, 1960, Ser. No. 28,011
14 Claims. (Cl. 167—82)

This invention relates to a novel water-in-oil emulsion which can be used to administer therapeutic and prophylactic materials.

At present there is need for a method of administering medicaments in relatively large quantities which can be absorbed into the blood stream at rates which are free of harmful effects. Such a method should enable the subject receiving the medication to derive benefit from regular and constant supply of the medicament to the body, so that a single treatment can last for a much longer period than has heretofore been realized.

Conventionally, medicaments are administered orally or by inoculation. Oral administration has the obvious disadvantage of involving irregular absorption of the medicament through the gastro-intestinal tract, as well as destruction and/or modification of the medicament by the digestive process. The inoculation of medicaments is done either by injection, without dilution of the medicament or by having the same dissolved in a carrier or solvent for injection into the body. By either method, the medicament is rapidly absorbed into the blood stream of the subject, and hence care must be taken to administer dosages which are not excessive for the relatively fast rate of absorption which is normally encountered. The factor of relatively rapid absorption of the medicament into the blood stream of the subject has imposed a serious limitation on the quantity of medicament which could be administered at a given time, and consequently heretofore it has been required to inoculate subjects more frequently than would be desirable.

The ideal administration of a medicament is that it be absorbed into the blood stream at a rate which produces no harmful effects to the subject, and that the rate be constant for an appreciable period of time. These criteria have been met substantially by means of the present invention.

Accordingly, an object of this invention is to provide a novel composition which permits the administration of medicaments in significantly greater quantities than has been possible heretofore.

Another object of this invention is to provide a composition containing a medicament which has the characteristic of indicating when the same is proper and safe for use.

Still another object of this invention is to provide a method of administering compositions containing a therapeutic or prophylactic agent in greater quantities than has been possible or desirable heretofore.

A further object is to provide a novel composition containing a medicament whereby it is possible that the treatment will be substantially longer in effectiveness than has been possible heretofore.

Other objects and advantages of my invention will be apparent from the following description and explanation thereof.

The present invention is concerned with an emulsion comprising an aqueous phase containing a medicament selected from a therapeutic or prophylactic agent dispersed within a non-toxic oil phase. The emulsion can be prepared so that the aqueous phase is dispersed as relatively fine particles, thus resulting in a very stable dispersion. For this purpose, generally the average size of the particles of aqueous phase may be about 0.5 or less to 1.5 microns. The emulsion can also be prepared for immediate and relatively rapid utilization, in which case the average particle size of the aqueous phase may not have to be as fine. However, the size of the particles of the aqueous phase also has a bearing on the rate at which the medicament is released from the emulsion for absorption into the blood stream of the subject. Consequently, for relatively faster absorption of non-toxic medicaments, the emulsion can be prepared so that the aqueous phase is present as particles having an average size of about 1.5 to 20 microns, or as high as 10 to 20 microns.

In a more particular aspect, the present invention is concerned with a novel water-in-oil emulsion which contains an indicating material in the aqueous phase which will serve to designate when the emulsion has not been prepared with the proper particle size of aqueous phase or when the emulsion has disrupted upon standing or after being mishandled.

It is my belief that the emulsions of the present invention provide prolonged treatment of a medicament at a desirable rate of absorption into the subject, because the rate of absorption is dependent upon the rate at which the oil of the emulsion is removed from the site of injection. As the oil is removed, the medicament which is present in the dispersed aqueous phase is liberated for absorption into the blood stream of the subject. Consequently, the rate of release is dependent upon the type of oil which is used as the medium in which the aqueous phase is dispersed. Mineral oils can be used in my invention, and because such oils are not absorbed, they must be removed by phagocytosis from the site of injection, and thus they provide the slowest rate of release of medicament which is contained within the aqueous phase. On the other hand, animal and vegetable oils of a non-toxic nature are removed from the site of injection by absorption and/or enzymatic action, and hence their rate of removal is relatively fast compared to the mineral oils. The animal and vegetable oils are not removed at the same rate, but vary from one another, due to differences in their chemical constitutions. Intermediate rates of removal between the mineral oils, on one hand, and the animal or vegetable oils on the other hand, can be achieved by using mixtures of the two oils.

Another factor contributing to the rate of release of the medicament is the size of particles of the aqueous phase. The smaller the particle size of the dispersed phase, the slower is the medicament released for absorption or assimilation into the blood stream of the subject. This may be explained on the basis that for each small quantity of oil which is removed, only a relatively small quantity of aqueous phase is exposed for absorption into the blood stream. With large particles of aqueous phase, the effect may be just the opposite.

The advantages which may be attributed to the present invention are many, such as high concentrations of medicament may be given in one injection for prolonged and sustained action; the rate of release of the medicament is relatively steady; toxic materials having therapeutic or prophylactic value can be injected into the subject without lethal effect; agents which have been known to be irritating and inflammatory by conventional methods of administration are now relatively free of such objections; and similarly, medicaments which normally cause pain when injected into the subject may be rendered painless.

The animals in which the emulsions can be used include all domestic as well as naturally wild animals. For example, the emulsions of this invention can be used in horses, cows, cattle, hogs, chickens, rabbits, dogs, etc. The compositions of this invention can also be used in human beings, for the purposes which are designated by the kind of medicament employed.

The medicaments which can be employed for the purpose of my invention may include any therapeutic or prophylactic agent, which is not soluble in the oil phase. The medicament may be insoluble in water or completely soluble therein or it may be intermediate of such solubilities, but it cannot be soluble in oil, otherwise it will not be entrapped as part of the aqueous phase within the oil phase. The medicament may include allergens, e.g., house dust extract (Center), house dust extract (Endo) lyophilized or aqueous, tree pollen, timothy pollen, plantain pollen, ragwood pollen, molds, epidermals, etc.; anesthetics, e.g., procaine, hydrochloride, etc.; antibiotics, e.g., procaine potassium penicillin G (suspension), tetracycline, chloramphenicol, oxytetracycline, nitrofuran, etc.; antimethabolites; antihistamines, e.g., diphenydramine hydrochloride, tripelennamine hydrochloride, chlorprophyenpyridamine, etc.; antienzyme, e.g., neostigmine, etc.; anticoagulant, e.g., heparin, etc.; anti-inflammatory agent, e.g., phenylbutazone, 3-5-dioxo-1,2 - diphenyl-4-n-butyl pyrazolidine, etc.; bronchodilators, e.g., epinephrine, isopropylarterenol, ethylnorepinephrine hydrochloride, protokylol hydrochloride, etc.; coagulant, e.g., medadione sodium bisulfite, etc.; diuretics, e.g., mercumatilin, mercaptomerin, sodium meralluride-theophylline, etc.; enzymes, e.g., chymotrypsin crystallized trypsin, etc.; hormones, e.g., insulin, globulin insulin, sodium succinate ester of hydrocortisone, ACTH (corticotrophin), corticotropin zinc, methicortelone, methylprednisolone acetate, pituitrin, etc.; stimulants, e.g., caffeine sodium benzoate, nikethamide, etc.; tranquilizers, e.g., chlorpromazine, methaminodiazepoxide, etc.; vaccines, e.g., typhoid (triple), influenza, polimyelitis, staphylococcus toxoid, etc.; vitamins, e.g., ascorbic acid, vitamin B complex, vitamin $B_{12}$, vitamin B., etc. The quantity of medicament which is incorporated into the aqueous phase may vary considerably in view of the nature of the material employed and the purpose of use, but in general, the amount employed may be about 1.5 to 10,000 times greater or even higher than is used conventionally for purposes of inoculation.

The oil of the emulsion can be a highly refined mineral oil or an animal or vegetable oil, just so long as it is non-toxic and will be capable of forming emulsions with aqueous materials. Examples of the oils are peanut oil, cottonseed oil, sesame oil, olive oil, corn oil, almond oil, etc. The aqueous materials do not disperse to the same extent in all oils, but instead some oils seem to emulsify better than others with a given aqueous material. For example, peanut oil is particularly effective in forming emulsions with procaine. It is also contemplated using a combination of oils to be emulsified with the aqueous material. For example, mineral oil can be used with either or both of animal or vegetable oils. Since mineral oils are removed at the slowest rate from the site of injection, they could be combined in varying proportions with animal or vegetable oils, for example, 1 part of the former with about 0.1 to 5 parts of the latter oils, on a weight basis, to obtain a rate of removal which is intermediate of the two oils. For the purpose of preparing the emulsion, the water material, on a volumetric basis, may vary from about 0.1 to equal parts per part of oil. The amount of aqueous material can vary in amounts considerably and this would be readily appreciated by those skilled in the art. In some instances, more aqueous phase can be added to give an emulsion containing 60% aqueous phase.

It is also contemplated for the purpose of my invention to use a non-toxic protective colloid to supplement the water phase. The cellulose derivatives such as, for example, carboxymethyl cellulose, hydroxy cellulose, methyl cellulose, etc., or vegetable gums such as for example acacia, tragacanth, karaya, caragen, etc., may be used for this purpose. The colloids form a gel-like matrix which tends to prevent the dispersed phase from settling out from the oil phase. The quantity of protective colloid may vary appreciably, however, in general it may comprise from about .01 to 1 wt. percent of the dispersed phase.

The dispersed phase of the emulsion may also contain an indicating material which serves to designate the state of emulsification. The indicating material may be a non-toxic dye, or pigment, or it may be a compound which can react with a reagent to give an indication of its concentration by the intensity of color which is produced. The indicating material must not be soluble in the oil phase, but should be soluble in the dispersed phase. The chemical nature of the indicating material is not important, i.e., it can be any organic or inorganic material, but the concentration in which it is used must not be toxic to the subject being inoculated. The state of emulsification can also be determined by other means, such as, for example, by relative measurements of conductivity of the emulsions, etc. Specific examples of the colored indicating material are methyl red, amaranth (sodium salt of 1,4 sulfo-1-naphthylazo naphthol-3,6 disulfonic acid), fluorescein, Congo red, bromphenol blue, bromcresol green, phenolsulphon-phthalein, etc. The colored indicating material may comprise from about .00005 to .5% more usually about .00005 to .005%, by weight of the dispersed phase. At relatively low concentrations, an emulsion containing the dispersed phase as particles of less than about 1.5 microns will give little or no evidence of color. When the particles grow larger in size, through cracking of the emulsion, color will re-appear. I have also found, quite unexpectedly, that the indicating material, particularly amaranth and phenolsulphophthalein, promote emulsification and/or stabilization of the emulsion. The same effect has been observed with respect to indicating materials, which per se are not colored, but serve the designated purpose by being detectable in small quantities by means of a suitable reagent. The non-colored indicating materials operate on the same principle as the colored indicating materials, that is, on the basis that relatively large sized particles of dispersed phase afford an opportunity for the non-colored indicating material and the reagent to react to form a colored reaction product, which is easily observed.

The non-colored indicating material may be detected in a bad emulsion by spot testing in accordance with the techniques described in Feigl's book entitled "Spot Tests in Inorganic Analysis," 1956 edition, published by Elsedier. Such techniques and the compounds disclosed therein are incorporated herein by reference and thus constitute a part of the present specification. The non-colored indicating material may be any ferric salt, which is non-toxic and is capable of being detected in very dilute concentrations in accordance with the spot testing technique. Ferric chloride is particularly suitable for this purpose, but other water soluble ferric salts may be used, which do not have toxic characteristics. In spot testing for the ferric ion, the well-known reagents, such as potassium ferrocyanide, ammonium or potassium thiocyanate may be used. The ferrocyanate reagent detects iron in dilutions of 1 to 500,000 whereas the thiocyanate reagents detect iron in dilution of 1 to 200,000. In general, the non-colored indicating material or the compound which is detected by spot testing may be present in the aqueous phase in an amount of about .001 to 0.5%, based on the weight of the dispersed phase. Upon spot testing for the state of emulsification, a drop of the emulsion to be tested may be placed on a filter paper previously saturated and dried with the reagent. If the emulsion is a good one, no color will appear immediately. If the drop is allowed to stand on the paper, it will be noted that, eventually, the drop develops color, which indicates that demulsification has occurred on the filter paper. Consequently, the results obtained in the first five seconds are to be considered as being fairly reliable, but beyond that time the secondary effect which causes the dispersed particles to agglomerate may occur. Spot testing can also be used with respect to other metal salts, such as those containing cobalt copper, nickel, cadmium, etc. While some of these metal salts may be toxic at certain levels, their use at the concentrations contemplated herein may be non-toxic; consequently, such materials may be effective for use in my invention.

I have also observed that the combination of a dye, such as, for example, amaranth and/or phenolsulfophthalein, with the non-colored indicating material, such as, for example, the ferric salt, e.g., ferric chloride, promotes emulsification and stabilizes the emulsion beyond what would be expected from their individual effects. For reasons not clearly understood by me, these materials synergize to give an improvement which is not foreseeable on the basis of their expected properties. The relative amounts of the two indicating materials may vary within the ranges given hereinabove for each type.

Aside from the emulsifying effect which is obtained from the indicating material, I also contemplate employing an emulsifying agent for my type of emulsion. The emulsifying agent must be non-toxic or non-toxic when used in the amounts at which emulsification is produced. Various classes of emulsifiers may be used for my invention, including such materials as a partial ester of a polyhydric alcohol and a fatty acid, a glycol ether, long chain fatty alcohol-polyoxyethylene, long chain fatty acid-polyoxyethylene, a partial ester of a fatty acid and a polyhydric alcohol condensed with ethylene oxide, etc. All the emulsifiers are non-ionic in character which makes them especially suitable because of their non-toxic character. The partial esters usually contain at least two free hydroxyl groups; consequently, they are derived from polyhydric alcohols containing at least 3 hydroxyl groups. These alcohols may contain as high as 12 hydroxyl groups, although usually, those containing up to 6 hydroxyl groups are used more often. The fatty acid, employed to esterify part of the hydroxyl groups, may contain about 8 to 24 carbon atoms, more usually about 12 to 18 carbon atoms. The polyhydric alcohols are, for example, glycerol, pentaerythritol, mannitol, etc. The fatty acids are, for example, lauric acid, oleic acid, stearic acid, octanoic acid, etc. Specific examples of such emulsifiers are mannitol mono-oleate, glycerol mono-oleate, pentaerythritol monolaurate, glucose dioctanoate, etc. The glycol ethers are derived from alkylene glycol and a long chain fatty alcohol, e.g., those containing about 12 to 24 carbon atoms in the alcohol molecule. The glycol ethers may have the formula $$R-CH-CH-O-R'$$
$$\phantom{R-CH-}|$$
$$\phantom{R-CH-}OH$$

wherein R may be an alkyl group of about 24 carbon atoms or hydrogen or a hydroxy substituted alkylene group, or hydroxy substituted alkyl group, and R' may be an alkyl group of about 12 to 24 carbon atoms. The condensate of ethylene oxide and a fatty alcohol may be represented by the following formula:

$$RO-(CH_2CH_2-O)_nOH$$

wherein R is an alkyl group containing about 12 to 24 carbon atoms and "$n$" is an integer ranging from about 10 to 40. The condensate of ethylene oxide and a fatty acid may be represented as follows:

$$RCO(CH_2-CH_2O)_nOH$$

wherein R is an alkyl group containing from about 8 to 24 carbon atoms, preferably 12 to 18 carbon atoms and "$n$" is an integer of 10 to 40.

The emulsifier is usually employed in an amount of about 1 to 15% by volume based on the dispersed phase. The amount of emulsifier employed may vary with the type of emulsifier being used. All emulsifiers are not equivalent in their effectiveness, that is, some are better than others.

I have also found that the combination of a partial ester containing five free hydroxyl groups, such as mannitol mono-oleate, with a partial ester containing two free hydroxyl groups, such as glycerol mono-oleate, produces an unusually effective emulsifier, as evident from the longer stability of the emulsion upon standing and from the fact that the emulsion is obtained faster. Generally, about 3 to 10 parts by volume of the partial ester containing five free hydroxyl groups are admixed with each part by volume of the partial ester containing three free hydroxyl groups.

The preparation of the emulsion may involve combining an emulsifier with the oil, adding the medicament, indicating material and stabilizer to the aqueous material and then combining the two phases to produce the emulsion. The emulsion can be obtained by various techniques, and all have one feature in common, that is, the emulsion containing suitably sized particles of dispersed phase is procured by agitation. The emulsion can be obtained by mechanical shaking at speeds of about 2000 r.p.m. and higher, ultrasonics, colloid mill, and a double syringe method involving two syringes which are interconnected by a double hubbed needle. The size of the needle is small enough to produce the desired shearing action. The method to be used may be governed by the particle size desired and the factor of sterility.

The following compositions illustrate emulsions in which the particle size of the dispersed phase is about 10 to 25 microns. The emulsion is prepared by emulsifying until the phases become undifferentiated and a drop of the emulsion floats on water. This composition can be used for antihistamine, antibiotic or any other medicament whose therapeutic effect is preferably to start quickly and continue for 24 hours or longer.

*Example 1*

|  | Cc. |
|---|---|
| Diphenhydramine HCl (10 mg. per cc. of $H_2O$) | 1 |
| Peanut oil (0.9 part) | 1 |
| Mannitol mono-oleate (0.1 part) | |

*Example 2*

|  | Cc. |
|---|---|
| Tripelennamine hydrochloride (100 mg. per cc. of $H_2O$) | 1 |
| Corn oil (0.9 part) | 1 |
| Mannitol mono-oleate (0.1 part) | |

*Example 3*

|  | Cc. |
|---|---|
| 300,000 units procaine penicillin G in water | 1 |
| Peanut oil (0.9 part) | 1 |
| Mannitol mono-oleate (0.1 part) | |

*Example 4*

|  | Cc. |
|---|---|
| 3,000,000 units procaine penicillin G in water | 1 |
| Corn oil (0.9 part) | 1 |
| Mannitol mono-oleate (0.1 part) | |

*Example 5*

| | | |
|---|---|---|
| 6-mercaptopurine | mg | 300 |
| Carboxymethylcellulose (0.2 wt. percent) | cc | 1 |
| Corn oil (0.88 part) | | |
| Mannitol mono-oleate (0.1 part) | cc | 1 |
| Glycerol mono-oleate (0.02 part) | | |

*Example 6*

| | | |
|---|---|---|
| 6-mercaptopurine | mg | 500 |
| Carboxymethylcellulose | cc | 1 |
| Peanut oil (0.88 part) | | |
| Mannitol mono-oleate (0.1 part) | cc | 1 |
| Glycerol mono-oleate (0.02 part) | | |

For very prolonged action, the dispersed phase contains particles of about 0.5 to 1.5 microns and mineral oil is used as the oil phase, of which the following compositions are illustrative:

Example 7

| | Cc. |
|---|---|
| Endotoxin lipopolysaccharide 3-*E. coli*, Difco) (0.1 mg. per cc. $H_2O$) | 1 |
| $FeCl_3$ (10% sol'n) | 0.05 |
| Congo red (0.1%) | 0.05 |
| Methyl cellulose (0.2%) | 0.2 |
| Mineral oil (0.88 part) | |
| Mannitol mono-oleate (0.1 part) | 1.3 |
| Glycerol mono-oleate (0.02 part) | |

Example 8

| | |
|---|---|
| Typhoid triple in $H_2O$ | 1 |
| $FeCl_3$ (10%) | 0.05 |
| Phenolsulfonphthalein (0.6 mg./cc.) | 0.05 |
| Methyl cellulose (0.2%) | 0.2 |
| Mineral oil (0.88 part) | |
| Mannitol mono-oleate (0.1 part) | 1.3 |
| Glycerol mono-oleate (0.02 part) | |

Example 9

| | |
|---|---|
| Insulin (40 units/cc. of $H_2O$) | 1 |
| $FeCl_3$ (10%) | 0.05 |
| Corn oil | 0.45 |
| Mineral oil | 0.45 |
| Mannitol mono-oleate | 0.1 |
| Glycerol mono-oleate | 0.02 |

Example 10

| | |
|---|---|
| Insulin (80 units/cc. of $H_2O$) | 1 |
| $FeCl_3$ (10%) | 0.05 |
| Corn oil | 0.45 |
| Mineral oil | 0.45 |
| Mannitol mono-oleate | 0.1 |
| Glycerol mono-oleate | 0.02 |

Example 11

| | |
|---|---|
| Ragweed extract (500 protein nitrogen units/cc.) | 1 |
| $FeCl_3$ (10%) | 0.05 |
| Amaranth (0.01%) | 0.05 |
| Carboxymethylcellulose | 0.2 |
| Mineral oil (.88 part) | |
| Mannitol mono-oleate (0.1 part) | 1.3 |
| Glycerol mono-oleate (.02 part) | |

Example 12

| | |
|---|---|
| Ragweed extract (10,000 protein nitrogen units/cc.) | 1 |
| $FeCl_3$ (10%) | 0.05 |
| Phenolsulfonphthalein (0.6 mg./cc.) | 0.05 |
| Carboxymethylcellulose | 0.2 |
| Mineral oil (0.88 part) | |
| Mannitol mono-oleate (.1 part) | 1.3 |
| Glycerol mono-oleate (0.02 part) | |

It is known that, when the reticulo endothelial system, abbreviated as RES, is stimulated, resistance to infection can be increased 10,000-fold. It is believed that resistance can be developed against a variety of infections, such as bacterial, viral, rickettsial, spirochetal and protozoan. This increased resistance can also retard malignant formations or cancerous growths and other types of possible illnesses. Heretofore, the RES could be stimulated by injecting the subject with an endotoxin, but the quantity of the same which was needed to achieve immunization usually proved lethal. For that reason and others, prior workers have been unable to stimulate the RES in a safe manner to produce the desired immunization.

Regarding the use of endotoxins to stimulate the RES, it has been noted that the subject receiving the endotoxin will usually experience a negative phase, during which time resistance to infection, etc., is reduced a thousand-fold, thus rendering the subject particularly susceptible to illness. To avoid the negative phase, prior workers have reduced the size of dose of endotoxin, but not with consistent results, because the amount of dosage which is safe does not always stimulate the RES sufficiently to produce the desired resistance. I have discovered by working with mice that my invention is effective to stimulate the RES for the desired effect, without having the subject experience the negative phase discussed above.

The endotoxins which can be used for my invention are derived, for example, from *E. coli*, B. typhoid, *B. typho murium*, Friedlander bacillus, *Brucella abortus*, *H. pertussis*, etc., all of which are derived from gram negative organisms. These materials produce toxin which contains lipopolysaccharide. Cell walls, e.g., yeast walls, zymosan or lipoids derived from non-pathogenic micro-organisms can also be used to stimulate the RES. The endotoxin or other suitable material is incorporated into the dispersed phase in a concentration which may be about 1 to 10 times, more usually about 1.5 to 5 times, the lethal dose by conventional standards of inoculation. The other characteristics of the emulsion may be any of those mentioned above, but it is preferred to use a mineral oil for the oil phase.

To illlustrate the effectiveness of using emulsions of endotoxin, the following example is given.

The emulsion of Example 7 was used to inoculate white mice. Preliminary studies were first made to ascertain the minimum lethal dose. This was established at 0.5 mg. of endotoxin. Ten mice were inocluated with four times the minimum lethal dose of the endotoxin contained in Example 7. At the end of eight weeks, all the mice were still alive, notwithstanding that death would normally occur within 18 hours. Two mice were injected with the same dose of unemulsified endotoxin and none has survived. This demonstrated conclusively that my emulsion is safe to use.

I have also been successful in emulsifying vasoconstrictors in oil mediums. In this connection, Levophed (levarterenol bitartrate) is an excellent vasconstrictor, but care had to be taken in its administration by intravenous injection, otherwise necrosis would ensue. If Levophed leaked from the vein, the same harmful effect would result. By emulsifying Levophed in accordance with my invention, it can be injected subcutaneously without harmful effects. In an animal study, the following emulsion was used:

Example 13

| | Cc. |
|---|---|
| Levarterenol bitartrate (0.2%) | 1 |
| $FeCl_3$ (10%) | 0.05 |
| Mineral oil (0.88 part) | |
| Glycerol mono-oleate (0.02 part) | 1.05 |
| Mannitol mono-oleate (0.1 part) | |

Five mice were injected subcutaneously with 0.1 cc. of Example 13, without producing a lethal or sloughing effect at the site of injection.

Regarding the allergens, it should be understood that they can be incorporated in water-glycerol mixtures, i.e., up to 50% glycerol, and still be effectively emulsified by my invention. Further, if desired, sugar, e.g., sucrose, can be incorporated into the aqueous phase, and serve as an indicating material by spot testing with an enzyme saturated filter paper. It is also contemplated having preservatives and other adjuvants present in my emulsions.

Further, with respect to the rate of absorption of the medicament in the body of the subject, a further improvement can be realized by incorporating into the dispersed phase a vasoconstrictor, e.g., Levophed, adrenalin, etc. Still further as to the stimulation of RES, tubercle bacillus or Bacillus Calmette-Guérin can be used.

I claim:

1. An injectable, stable, homogeneous emulsion comprising an aqueous phase containing a material selected from the group consisting of a therapeutic agent and a prophylactic agent dispersed within a non-toxic oil phase, said dispersed phase comprised of particles having an average size of about 0.5 to 1.5 microns.

2. The emulsion of claim 1 wherein the oil is a mineral oil.

3. A homogeneous injectable emulsion comprising an aqueous phase containing a medicament selected from the group consisting of a therapeutic agent and a prophylactic agent and a non-toxic indicating material dispersed within a non-toxic oil phase, said dispersed phase being comprised of particles having an average size of about 0.5 to 25 microns and the indicating material does not distinguish the phases of the homogeneous emulsion but is used to designate when the emulsion is disrupted.

4. The emulsion of claim 3 wherein the indicating material is the combination of a non-toxic dye and a salt of a non-toxic metal which is capable of being spot tested.

5. The emulsion of claim 3 wherein the indicating material is a ferric salt.

6. The emulsion of claim 3 wherein the oil is a mineral oil.

7. The oil of the emulsion of claim 3 being selected from the group consisting of a vegetable oil and an animal oil.

8. The emulsion of claim 3 having an oil which is a mixture of a mineral oil and an oil selected from the group consisting of an animal oil and a vegetable oil.

9. The emulsion of claim 3 wherein the indicating material is colored.

10. The emulsion of claim 3 wherein the indicating material is a metal salt which is capable of detection by spot testing.

11. A homogeneous injectable emulsion comprising an aqueous phase containing a material selected from the group consisting of a therapeutic agent and a prophylactic agent and a non-toxic indicating material dispersed within a non-toxic oil phase, said dispersed phase being comprised of particles having an average size of about 0.5 to 25 microns, the emulsion containing a non-toxic emulsifying agent and the indicating material does not distinguish the phases of the homogeneous emulsion but is used to designate when the emulsion is disrupted.

12. An injectable, stable, homogeneous emulsion comprising an aqueous phase containing a water soluble medicament and a water soluble non-toxic indicating material dispersed homogeneously within a non-toxic oil, said dispersed phase comprising particles having an average size of about 0.5 to 1.5 microns, and the indicating material does not distinguish the phases of the homogeneous emulsion but is used to designate when the emulsion is disrupted.

13. An injectable, stable, homogeneous emulsion comprising an aqueous phase containing a material selected from a group consisting of a therapeutic agent and prophylactic agent dispersed within a non-toxic oil phase, said emulsion containing at least one non-toxic emulsifying agent selected from the group consisting of a partial ester of a polyhydric alcohol and a fatty acid of about 8 to 24 carbon atoms, said partial ester containing 5 free, unesterified hydroxyl groups and a partial ester of a polyhydric alcohol and a fatty acid of about 8 to 24 carbon atoms, said partial ester containing 2 free, unesterified hydroxyl groups, and said dispersed phase comprised of particles having an average size of about 0.5 to 1.5 microns.

14. The emulsion of claim 13 wherein the oil is at least one selected from the group consisting of mineral oil and vegetable oil.

References Cited in the file of this patent
UNITED STATES PATENTS

| | | |
|---|---|---|
| 2,491,537 | Welch | Dec. 20, 1949 |
| 2,507,193 | Buckwalter | May 9, 1950 |
| 2,515,898 | Rhodehamel | July 18, 1950 |
| 2,675,343 | Clymer et al. | Apr. 13, 1954 |
| 2,819,199 | Kalish | Jan. 7, 1958 |
| 2,916,416 | Buckwalter | Dec. 8, 1959 |

OTHER REFERENCES

"The Act of Compound," Jenkins et al., McGraw-Hill Book Co., Inc., New York, 1957, pp. 315–316, 320, and 323.

UNITED STATES PATENT OFFICE
CERTIFICATE OF CORRECTION

Patent No. 3,096,249　　　　　　　　　　　　　　July 2, 1963

Samuel J. Prigal

It is hereby certified that error appears in the above numbered patent requiring correction and that the said Letters Patent should read as corrected below.

Column 3, lines 23 and 24, for "chymotryp,sin" read -- chymotrypsin, --; lines 26 and 27, for "methicortelone" read -- meticortelone --; line 60, for "amounts" read -- amount --; column 10, line 37, under the heading "OTHER REFERENCES" for "The Act of Compound" read -- The Art of Compounding --.

Signed and sealed this 25th day of February 1964.

(SEAL)
Attest:
ERNEST W. SWIDER

Attesting Officer

EDWIN L. REYNOLDS

Acting Commissioner of Patents